(12) United States Patent
Tu et al.

(10) Patent No.: US 9,224,071 B2
(45) Date of Patent: Dec. 29, 2015

(54) UNSUPERVISED OBJECT CLASS DISCOVERY VIA BOTTOM UP MULTIPLE CLASS LEARNING

(71) Applicant: Microsoft Corporation, Redmond, WA (US)

(72) Inventors: Zhuowen Tu, Beijing (CN); Yichen Wei, Beijing (CN); Eric I-Chao Chang, Beijing (CN); Junyan Zhu, Pittsburgh, PA (US); Jiajun Wu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 240 days.

(21) Appl. No.: 13/681,020

(22) Filed: Nov. 19, 2012

(65) Prior Publication Data

US 2014/0140610 A1     May 22, 2014

(51) Int. Cl.
  *G06K 9/62*     (2006.01)
  *G06K 9/68*     (2006.01)
  *G06K 9/70*     (2006.01)
  *G06K 9/74*     (2006.01)

(52) U.S. Cl.
  CPC .............. *G06K 9/628* (2013.01); *G06K 9/6259* (2013.01)

(58) Field of Classification Search
  None
  See application file for complete search history.

(56) References Cited

U.S. PATENT DOCUMENTS

| 7,406,200 | B1 * | 7/2008 | Syeda-Mahmood et al. . | 382/225 |
| 8,111,923 | B2 | 2/2012 | Csurka et al. | |
| 2008/0205772 | A1 * | 8/2008 | Blose et al. | 382/225 |
| 2011/0158510 | A1 * | 6/2011 | Aguilar et al. | 382/159 |
| 2013/0194177 | A1 * | 8/2013 | Sakata | 345/156 |
| 2014/0056473 | A1 * | 2/2014 | Tojo | 382/103 |
| 2014/0140610 | A1 * | 5/2014 | Tu et al. | 382/159 |
| 2014/0376769 | A1 * | 12/2014 | Bulan et al. | 382/103 |

OTHER PUBLICATIONS

Weber et al. "Unsupervised Learning of Models for Recognition", Computer Vision—ECCV 2000 Lecture Notes in Computer Science vol. 1842, 2000, pp. 18-32.*

Zhu, et al., "Unsupervised Object Class Discovery via Saliency-Guided Multiple Class Learning", In IEEE Conference on Computer Vision and Pattern Recognition, Jun. 16, 2012, 8 pages.

Rutishauser, et al., "Is Bottom-up Attention Useful for Object Recognition?", In IEEE Computer Society Conference on Computer Vision and Pattern Recognition, Jun. 27, 2004, 8 pages.

Russell, et al., "Using Multiple Segmentations to Discover Objects and their Extent in Image Collections", In IEEE Computer Society Conference on Computer Vision and Pattern Recognition, Jun. 17, 2006, 8 pages.

Zhang, et al., "Maximum Margin Multiple Instance Clustering With Applications to Image and Text Clustering", In IEEE Transactions on Neural Networks, vol. 22, Issue 5, May, 2011, 13 pages.

(Continued)

*Primary Examiner* — Randolph I Chu
(74) *Attorney, Agent, or Firm* — Miia Sula; Judy Yee; Micky Minhas (57) ABSTRACT

Techniques for unsupervised object class discovery via bottom-up multiple class learning are described. These techniques may include receiving multiple images containing one or more object classes. The multiple images may be analyzed to extract top saliency instances and least saliency instances. These saliency instances may be clustered to generate and/or update statistical models. The statistical models may be used to discover the one or more object classes. In some instances, the statistical models may be used to discover object classes of novel images.

18 Claims, 8 Drawing Sheets

(56) References Cited

OTHER PUBLICATIONS

Tuytelaars, et al., "Unsupervised Object Discovery: A Comparison", In International Journal of Computer Vision, Jul. 25, 2009, 19 pages.

Felzenszwalb, et al., "Object Detection with Discriminatively Trained Part-Based Models", In IEEE Transactions on Pattern Analysis and Machine Intelligence, vol. 32, Issue 9, Sep. 2010, 19 pages.

Cheng, et al., "Global Contrast Based Salient Region Detection", In IEEE Conference on Computer Vision and Pattern Recognition, Jun. 20, 2011, 8 pages.

Chang, et al., "From Co-Saliency to Co-Segmentation: An Efficient and Fully Unsupervised Energy Minimization Model", In In IEEE Conference on Computer Vision and Pattern Recognition, Jun. 20, 2011, 8 pages.

* cited by examiner

| 1 | Input: Bags $\{x_1, \ldots, x_n\}, \{y_1, \ldots, y_n\}, T, K, H_K^0$. |
| --- | --- |
| 2 | Output: $K$ classifiers: $h^1, \ldots, h^K$. |
| 3 | $r = 0$. |
| 4 | Repeat |
| 5 | $\quad r \leftarrow r + 1$. |
| 6 | $\quad$ For $k = 1 \to K$ do {M Step} |
| 7 | $\quad\quad$ Given class variables $H_K^{r-1}$, group terms |
| 8 | $\quad\quad$ $\mathcal{L}^k(h_r^k; Y, X, H_K^{r-1})$ by class indices. |
| 9 | $\quad\quad$ Train a strong MIL classifier $h_r^k$ to minimize |
| 10 | $\quad\quad$ $\mathcal{L}^k(h_r^k; Y, X, H_K^{r-1})$ via MIL-Boost. $T$ is the |
| 11 | $\quad\quad$ number of weak classifiers in MIL-Boost. |
| 12 | $\quad$ end for |
| 13 | $\quad$ for $i = 1 \to n$ do {E Step} |
| 14 | $\quad\quad$ Compute $\Pr(y_i = 1, k_i = k | x_i; \theta_r)$ using |
| 15 | $\quad\quad$ estimated model $\theta_r = \{h_r^1, \ldots, h_r^K\}$. |
| 16 | $\quad\quad$ Sample $k_i$ via $\Pr(k_i = k | y_i = 1, x_i; \theta_r)$: $\Pr(y_i =$ |
| 17 | $\quad\quad$ $1, k_i = k | x_i; \theta_r)$. |
| 18 | $\quad$ end for |
| 19 | until $H_K^r = H_K^{r-1}$ |

UNSUPERVISED OBJECT CLASS DISCOVERY VIA BOTTOM UP MULTIPLE CLASS LEARNING

BACKGROUND

One application of machine learning uses computer vision techniques to analyze and understand images in order to produce numerical or symbolic information from the images. These types of techniques can be used by a machine to recognize that a picture of a book contains an image of a book. The computer vision techniques achieve great success in fully supervised object recognition in which label images are used to train a recognition system. However, fully supervised object recognition demands a large amount of labeled training data, which is costly to obtain and not always available because most labeled training data is created by manual human labeling of images. To avoid the need for extensive human involvement, many unsupervised approaches have been proposed for training object recognition systems. While important progresses have been made, these unsupervised approaches require certain conditions, e.g., large occupation of foreground objects, exclusion of irrelevant other object types and clean backgrounds. These conditions limit application of unsupervised object recognition.

SUMMARY

Described herein are techniques for unsupervised object class discovery. The techniques may retrieve a set of training images for object recognition model learning. The techniques may then automatically and simultaneously localize objects of the training image, discover object classes of the objects and train machine learning models. The trained machine learning models may then be used to discover object classes of novel images.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure is directed, in part, to unsupervised object class discovery via bottom-up multiple class learning. Embodiments of the present disclosure train statistical models using a bottom-up saliency detection algorithm as well as a maximum margin algorithm, and discover object classes of images using the trained statistical models.

In accordance with the embodiments, a set of images may be received, and saliency instances may be extracted from the set of images. Top saliency instances extracted from individual image may be labeled as a positive bag, while least saliency instances may be labeled as a negative bag. Both positive and negative bags of the set of images may be collected to train the statistical models using a maximum margin learning algorithm. This algorithm may be implemented to discriminate positive bags (e.g., foreground objects) from negative bags (e.g., background objects) and to maximize differences among the positive bags. The trained statistical models may be then used to discover object classes.

Existing techniques for unsupervised object learning includes Multiple Instance Learning (MIL) and Multiple Instance Clustering (MIC). MIL significantly reduces efforts in manual labeling for object detection. However, existing MIL solutions cannot be directly applied in unsupervised object discovery since they assume a single object class among positive bags. While existing MIC solutions are designed to perform localized content-based image clustering with fewer constraints, their performance is poor because they treat all the images as positive bags. But embodiments of the present disclosure automatically and simultaneously localize objects, discover object classes and train statistical models thereby significantly improving object learning.

Illustrative Architecture

Figure 1:
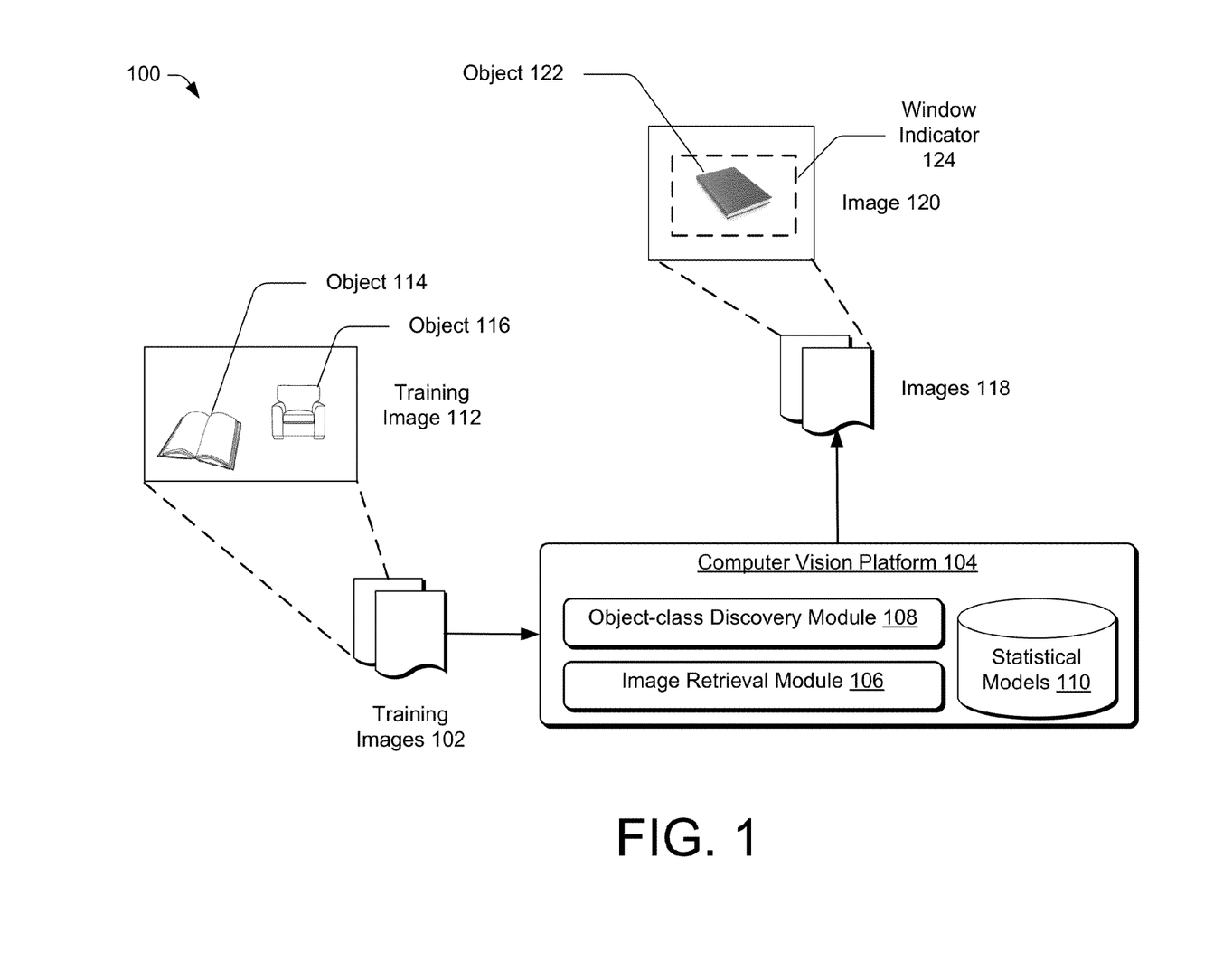
FIG. 1 illustrates an example architecture that includes a computer vision platform for discovering object classes.

FIG. 1 illustrates an example architecture 100 in which machine learning models are trained using training images and object classes are discovered from novel images using the trained models. The architecture 100 may include a set of training images 102 and a computer vision platform 104. The computer vision platform 104 may retrieve the training images 102 via an image retrieval module 106. The retrieved training images 102 may be processed and analyzed by an object-class discovery module 108. The object-class discovery module 108 may generate and/or update statistical models 110, which are applied to construction of computer vision systems for, e.g., objection recognition, automatic navigation, and image searches.

In the illustrated embodiment, the training images 102 are retrieved by the computer vision platform 104. Individual image of the training images 102 may include an object that belongs to an object class, which is a class, category, or pattern of the object. In some instances, the object may belong to various object classes. Here, the object may be an object of interest (e.g., cat, dog, house, bike, sky, and the like) in the individual images of the training images 102, and the individual image may include one or more objects. For instance, a training image 112 may include an object 114 (i.e., a book) and an object 116 (i.e., a chair). In some instances, the object may include the object of interest and attributes of the object of interest, e.g., cloudy sky, yellow cats, and high-speed trains. In some instances, the object may include concepts, e.g., fashion, beauty, and hot/cool. For some of the concepts, the meaningful content, value, or boundaries of their application may vary considerably based on context or conditions. In other words, these concepts may be hard to describe in terms of quantitative limits or parameters.

In some embodiments, the computer vision platform 104 may retrieve the training images 102 using search engines, e.g., Bing® and Google®, based on a keyword (e.g., book). In some instances, the computer vision platform 104 may be provided (e.g., manually by users, programmers, or the like)

a predetermined number of object classes that need to be discovered and/or learned from the training images 102. In other instances, the number of object classes to be discovered may not be available to the computer vision platform 104. In such instances the computer vision platform 104 operates without a predetermined number of object classes.

After retrieving the training images 102, the computer vision platform 104 may automatically and simultaneously localize objects, discover object classes, and generate and/or update the statistical models 110. Using the statistical models 110, the computer vision platform 104 may localize objects and discover object classes of images 118, which were not previously processed by the computer vision platform 104. In some embodiments, one individual model of the statistical models 110 may be trained to discover an object class. Thus, the individual model corresponds to an object class and functions in identifying objects that belong to that object class. In these instances, the learned individual model may be used to discover and localize objects that belong to the object class in the images 118.

Turning back to the illustrated embodiment, a novel image 120 may be analyzed using the trained statistical models 110, and an object 122 (i.e., a book) may be localized as indicated by a window indicator 124. In some instances, the computer vision platform 104 may identify the discovered object 122 in the novel image 120 as a book, and/or indicate that this discovered object 122 and the object 114 of the training image 112 belong to the same object class.

Illustrative Scheme

Figure 2:
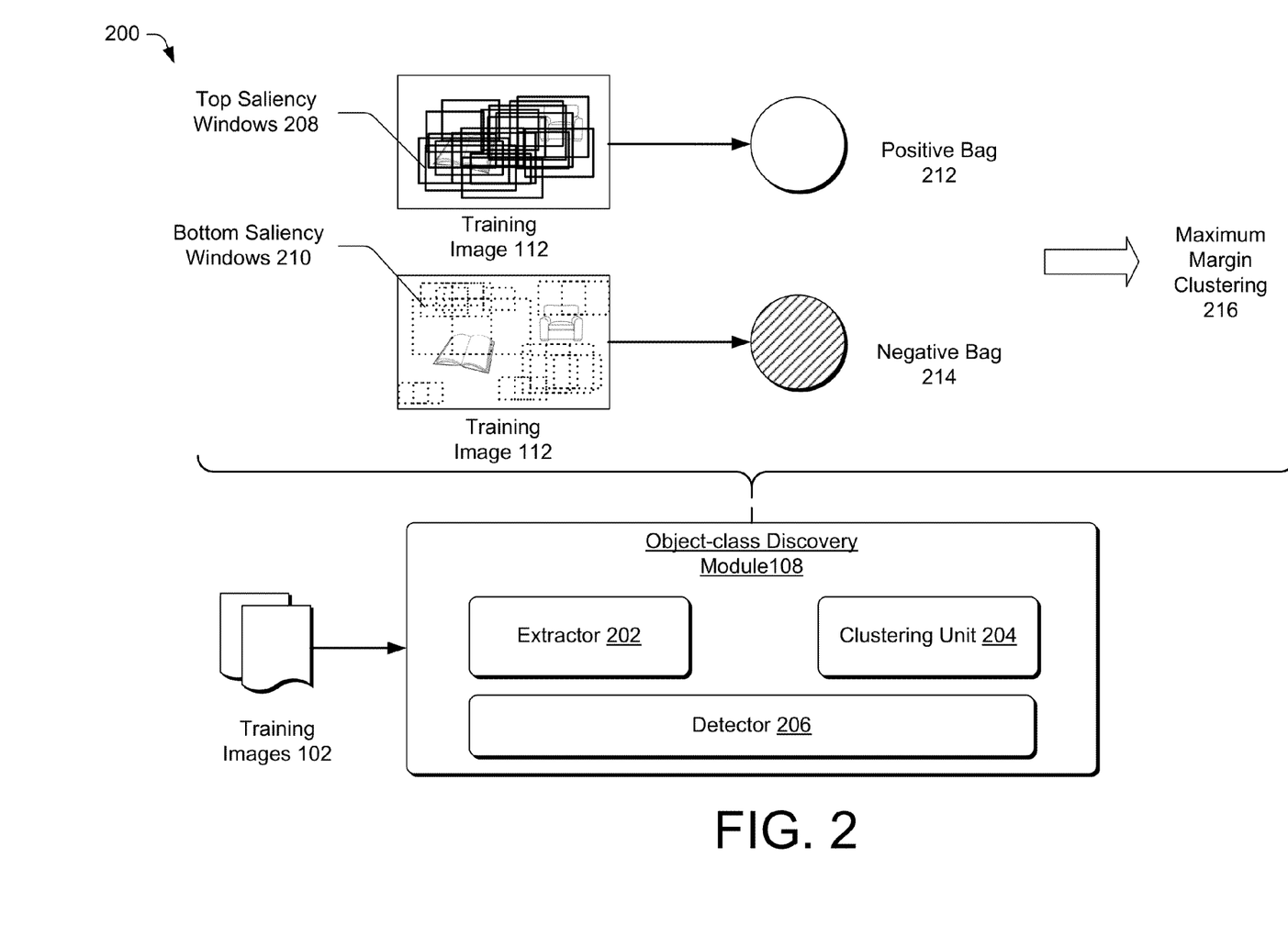
FIG. 2 illustrates an example scheme for saliency-guided multiple class learning.

FIG. 2 illustrates an example scheme 200 for saliency-guided multiple class learning. The scheme 200 may include the training images 102 and the object-class discovery module 108. The object-class discovery module 108 may include an extractor 202, a clustering unit 204, and a detector 206. The extractor 202 may function to extract saliency instances from the training images 102 using a saliency detection algorithm. The extracted saliency instances may be collected and clustered by the clustering unit 204 to generate and/or update the statistical models 110. The statistical models 110 may be used by the detector 206 to discover objects from novel images.

In some embodiments, the extractor 202 may determine top saliency instances using a window-based saliency detection algorithm. The extractor 202 may generate multiple salient windows on the training images 102 to represent saliency instances. Here, the instances may be raw data of an image region (e.g., image patches). Accordingly, a saliency instance or salient window may include one or more salient objects that are distinguished from backgrounds of images. The extractor 202 may calculate saliency scores for the multiple salient windows and then extract top salient windows for clustering. In some instances, such as for a training image (i.e., the image 112), the extractor 202 may determine a predetermined number of the salient windows that have saliency scores greater than other windows of the multiple windows extracted from the training image (e.g., 70 salient windows of the image 112 having top saliency scores).

It has been observed in the Spatially Independent, Variable Area, and Lighting (SIVAL) dataset that 98% of objects are covered in the top 70 salient windows. This property naturally allows defining positive and negative bags for multiple instance learning. In some instances, the positive bag 212 may include the top salient windows (e.g., the predetermined number of the salient window) of a training image 112. The negative bag 214 may include randomly sampled and/or bottom salient windows of the training image 112. Here, individual image of the training images 102 may have a positive bag 212 and a negative bag 214. In this way, unsupervised object discovery may be converted into a weakly supervised learning problem.

After determination of positive bags 212 and negative bags 214 for the training images 102, the clustering unit 204 may collect top salient windows of the training images 102, and perform an initial clustering using a data mining algorithm (e.g., K-mean algorithm) to obtain initial clusters. Based on the initial clusters, the clustering unit 204 may perform a refined clustering using a local optimal algorithm to generate and/or update the statistical models. In some embodiments, the local optimal algorithm may be bottom-up Multiple Class Learning (bMCL) algorithm, which is discussed in a greater detail below. In other embodiments, the local optimal algorithm may be a Convex-Concave Computational Procedure (CCCP) algorithm or a Boost Multiple Instance Learning (MIL) algorithm.

In the illustrated embodiment, for the training image 112, a set of top saliency windows 208 and a set of bottom saliency windows 210 may be generated, as indicated by solid rectangles and dashed rectangles respectively in FIG. 2. For example, the top saliency windows 208 may include a predetermined number (e.g., 70 windows) of saliency windows having saliency scores greater than other saliency windows of the image 112. The bottom saliency windows 210 may include a number of randomly sampled saliency windows and a predetermined number (e.g., 20) of the bottommost saliency windows having saliency scores less than other saliency windows of the image 112.

The top saliency windows 208 may be labeled as being grouped in a positive bag 212, while the bottom saliency windows 210 may be labeled as being grouped in a negative bag 214. Accordingly, the positive bag 212 represents the top saliency windows 208 having saliency scores greater than other saliency windows of the image 112. The negative bag 214 represents the bottom saliency windows 210 and may also include other randomly sampled saliency windows of the image 112 that are not included in either the top saliency windows 208 or the bottom saliency windows 210.

Similarly, positive bags 212 and negative bags 214 may be extracted from other images of the training images 102. In some embodiments, each image of the training images 102 may include a positive bag (e.g., the positive bag 212) and a negative bag (e.g., the negative bag 214). By way of example and not limitation, individual images of the training images 102 may be assumed to have a foreground object class (i.e., the images show at least one foreground object). For example, it may be assumed that the training image 112 has an object class (e.g., book or chair).

Based on the positive bags and negative bags of the training images 102, a clustering may be performed using maximum margin clustering 216 to maximize margins among the positive bags of different object classes, and between positive bags 212 and negative bags 214. In these instances, the clustering may be associated with two-level hidden variables: hidden variables associated with saliency instances and hidden variables associated object classes. These hidden variables may be estimated using Discriminative Expectation—Maximization Algorithm (DiscEM). Accordingly, the clustering may be performed to generate and/or update the statistical models 110 under hidden variables. The hidden variable may be optimized to maximize margins among positive bags of different object classes and between positive bags 212 and negative bags 214. The learned statistical models 110 may be used to localize objects and discover object classes of the images 118.

Illustrative Operations

Figure 3:
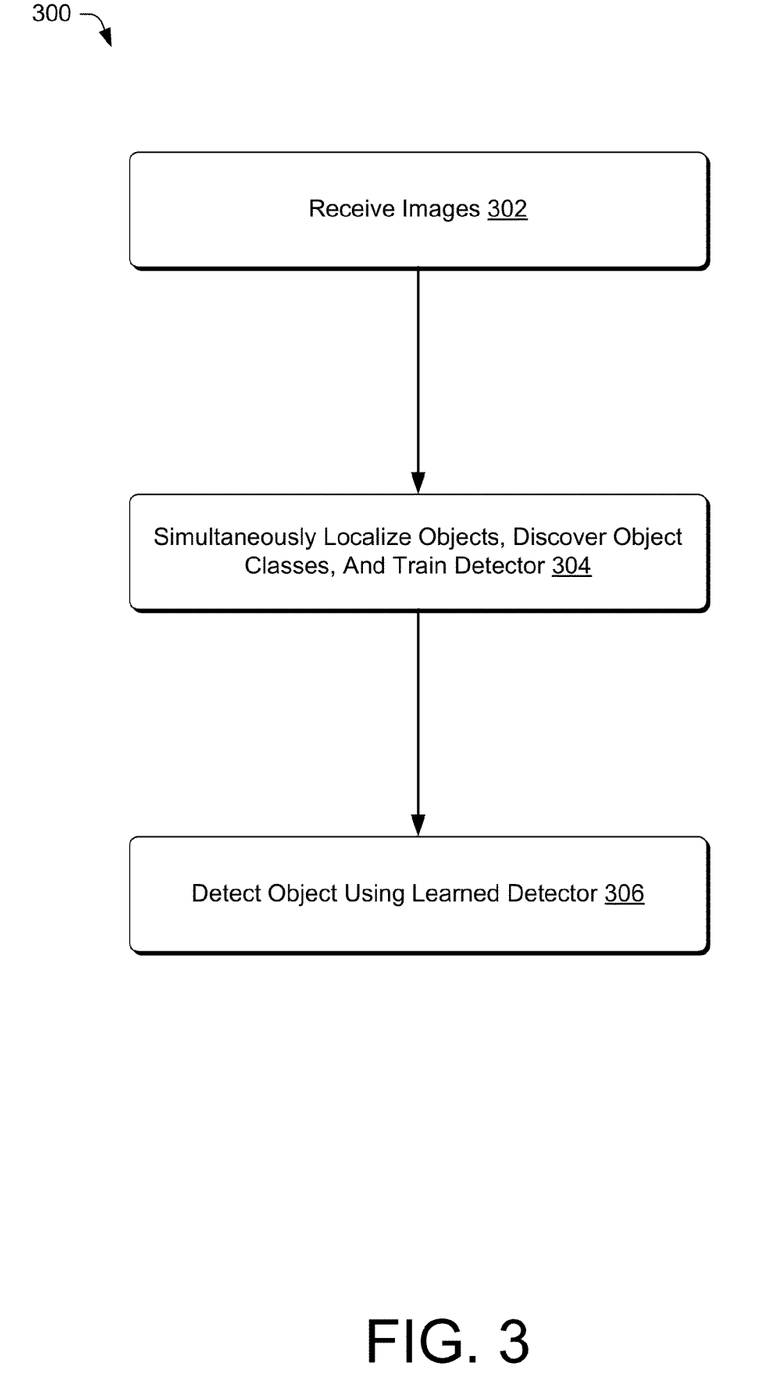
FIGS. 3-6 illustrate example processes for employing the techniques described in FIGS. 1 and 2.

FIG. 3 is a flow diagram of an illustrative process 300 for object-class discovery via saliency-guided multiple class learning. The process 300 and other processes described throughout this disclosure including the processes 400, 500, and 600 are illustrated as collections of blocks in logical flow graphs, which represent sequences of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

At 302, the image retrieval module 106 may retrieve the training images 102 for the purpose of saliency-guided multiple class learning. For example, the training images may be retrieved using search engines, e.g., Bing® and Google®. In some embodiments, the training images 102 may include an object of interest or at least majority of the training images 102 may include the object of interest (e.g., the book in the training image 112). For example, a keyword (e.g., book) may be searched for images using the search engines, and a set of images may be returned corresponding to the keyword. The set of images may be used as the training images 102 for saliency-guided multiple class learning.

In some embodiments, the saliency-guided multiple class learning may be performed without information regarding what object classes the computer vision platform 104 is to discover and/or learn. In some instances, a number of object classes may be assigned as input to notify the computer vision platform 104 how many object classes need to be discovered from the training images 102. In other instances, the computer vision platform 104 may not know how many object classes of training images 102 need to be discovered.

At 304, the object-class discovery module 108 may localize objects and discover object classes, and train the detector 206 simultaneously and in an unsupervised way. The operation 304 may be implemented using bottom-up (i.e., saliency-guided) multiple class learning (bMCL). To formulate the bMCL, a saliency detection algorithm may be adopted to convert unsupervised learning into weakly supervised multiple instance learning, which is discussed in a greater detail in FIG. 4. Further, a DiscEM algorithm may be utilized to solve bMCL problems regarding hidden variables, and therefore to localize objects, discover object classes, and train the detector 206 simultaneously in an integrated framework. In some embodiments, single object location and class discovery may be performed using the bMCL framework.

Previous unsupervised object discovery methods cannot obtain discriminative object models in an integrated manner. They are either restricted to only categorization (i.e., no object localization) or have to resort to a separate detector training process using their localization results or only obtain specialized detectors, such as chamfer distance based shape templates. By contrast, bMCL integrates the detector training into the framework for generic object classes.

At 306, the trained detector 206 may be used to detect an object in a novel image (e.g., the novel image 120). The trained detector 206 may both localize the object and discover the object class in the novel image at the same time as illustrated in FIG. 1. In some embodiments, the computer vision platform 104 may automatically retrieve a large amount of images using search engines, and train the statistical models 110 to learn various object classes. Accordingly, the computer vision platform 104 may enable search engines to filter searched images before returning them to users or to filter raw images before indexing them.

Figure 4:
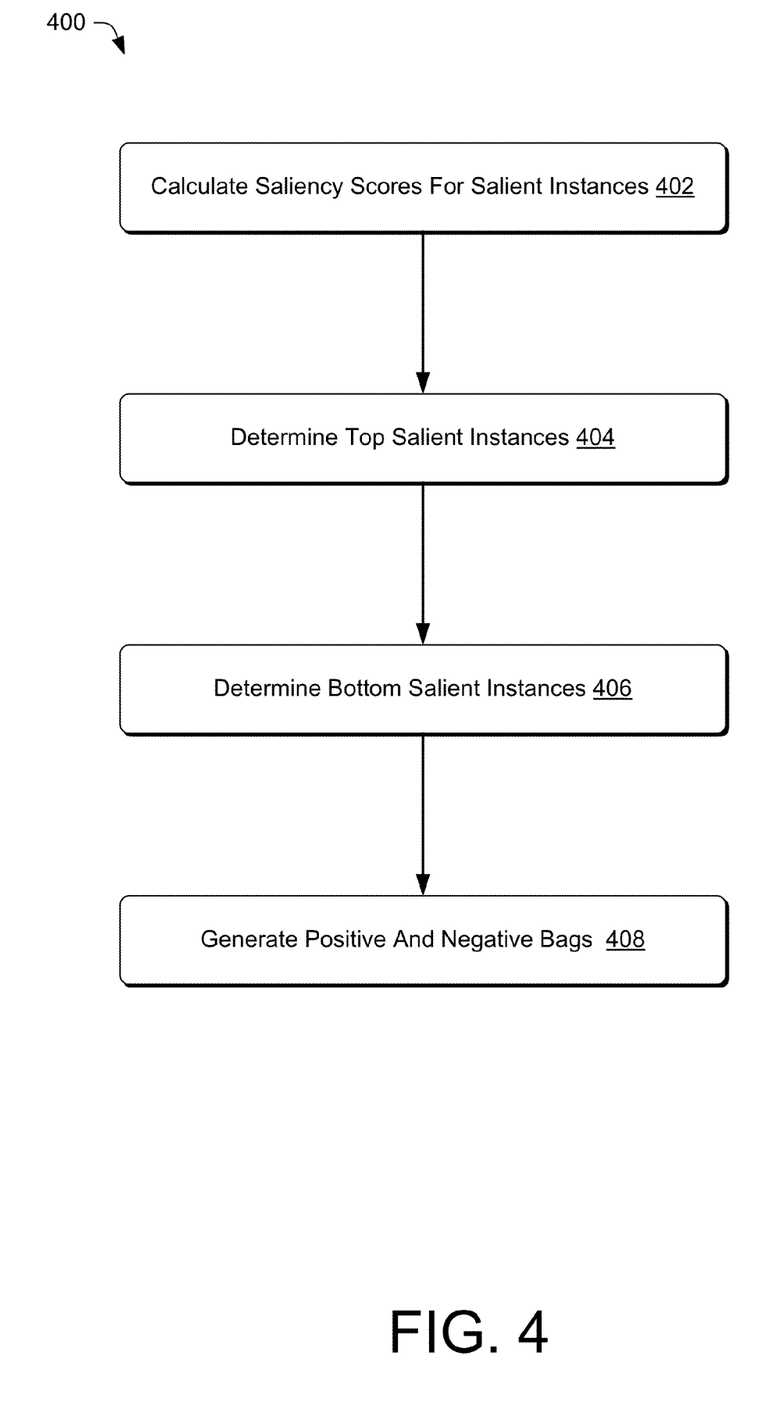

FIG. 4 is a flow diagram of an illustrative process 400 for saliency detection and saliency instances labeling as illustrated in FIG. 2. At 402, the extractor 202 may calculate saliency scores for saliency instances of the training images 102. In the embodiment illustrated in FIG. 2, window-based saliency detection may be implemented to measure how likely an image window contains a salient object. This method may compute the saliency scores for all windows and output locally optimal windows as object candidates. Although a complex background may create some false detection, it has been observed that objects are mostly covered in the windows having top ranked saliency scores.

Based on the computed saliency scores of saliency windows, the extractor 202 may determine top saliency windows as top saliency instances of individual image of the training images 102 (e.g., the training image 112) at 404. For example, the top saliency windows may include a predetermined number of saliency windows having saliency scores greater than other saliency windows of saliency windows generated from the image 112. In other instances, the top saliency windows may include saliency windows having saliency scores such as to satisfy a predetermine condition (e.g., greater than a predetermined saliency scores).

At 406, the extractor 202 may determine bottom saliency windows as bottom saliency instances. For example, the bottom saliency windows may include a predetermine number of saliency windows having saliency scores less than other saliency windows generated from the image 112. The bottom saliency windows may also include saliency windows that are randomly sampled in the image 112. In other examples, the bottom saliency windows may include saliency windows having saliency scores that satisfy a predetermine condition (e.g., less than a predetermined saliency score).

At 408, positive bags and negative bags may be generated to label the top saliency instances and the bottom saliency instances. In some embodiments, a training image may have a positive bag containing the top saliency instances of the training image, and a negative bag containing the bottom saliency instances of the training image. The positive bags and negative bags may be collected and utilized for maximum margin clustering, which is discussed in a greater detail in FIG. 5.

Figure 5:
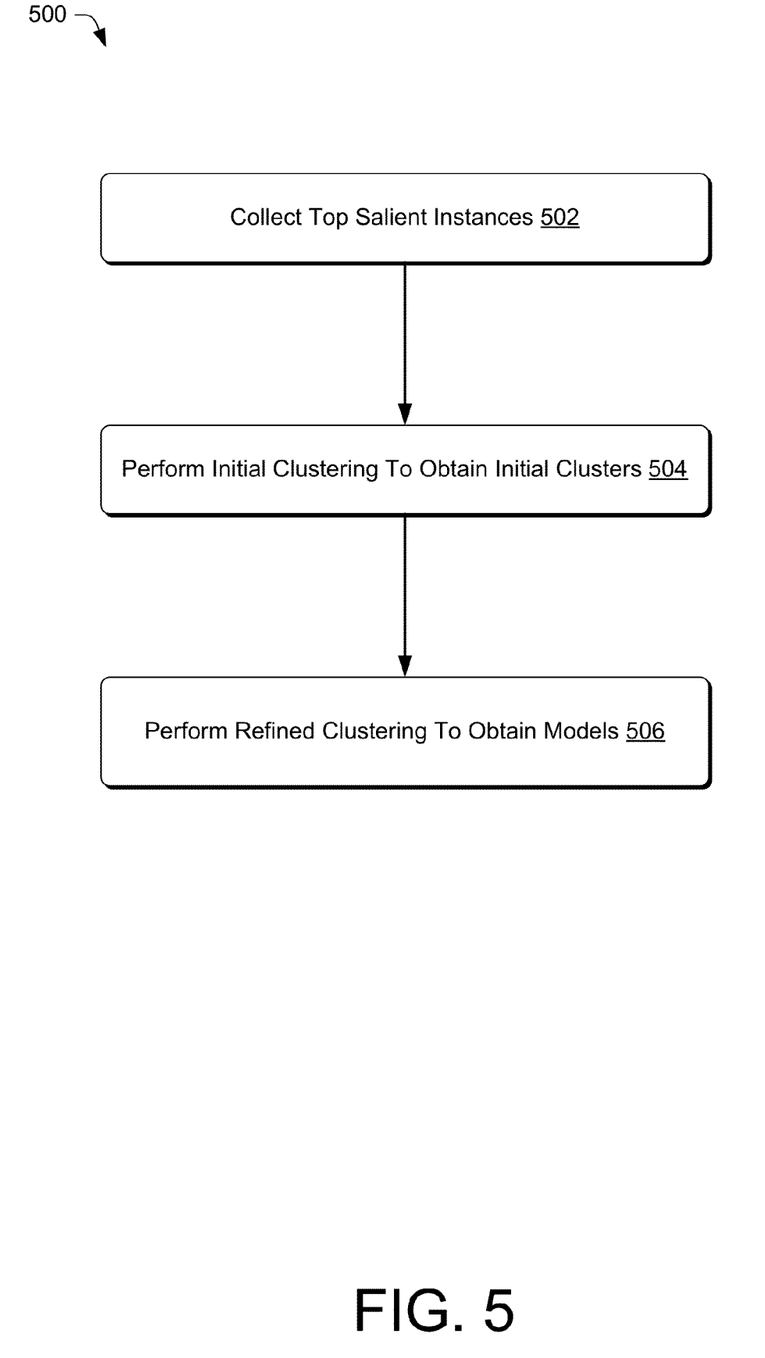

FIG. 5 is a flow diagram of an illustrative process 500 for maximum margin clustering 216 learning as illustrated in FIG. 2. At 502, the top saliency instances of the training images may be collected for clustering. At 504, an initial clustering may be performed using a data mining algorithm (e.g., K-mean algorithm) to obtain initial clusters.

At 506, another clustering may be performed based on the initial clusters to generate and/or update the statistical models 110. The clustering may be implemented using a local optimal algorithm, e.g., bMCL, CCCP, or Boost MIL. The local optimal algorithm may function to maximize 1) margins among the positive bags derived from the training images 102, and 2) margins between the positive bags and the negative bags derived from the training images 102.

To optimize the maximum margin clustering 216, discriminative learning may be conducted under the presence of hidden variables using the DiscEM algorithm. The hidden variables may be divided into two types based on their levels. One type is hidden variables associated with saliency instances, and the other type is hidden variables associated the object classes. The DiscEM algorithm may be implemented via two steps: an E step and an M step. The E step may include sampling and applying a statistical model to the probability estimation of an instance label and a class label corresponding to the statistical model. The M step may include training a new detector based on the sampled data. In some embodiments, EM steps for hidden instance labels may be replaced by a standard Boost MIL, and class labels may be then integrated out. The learned detector may be used to localize objects and discover object classes of novel images.

Figure 6:
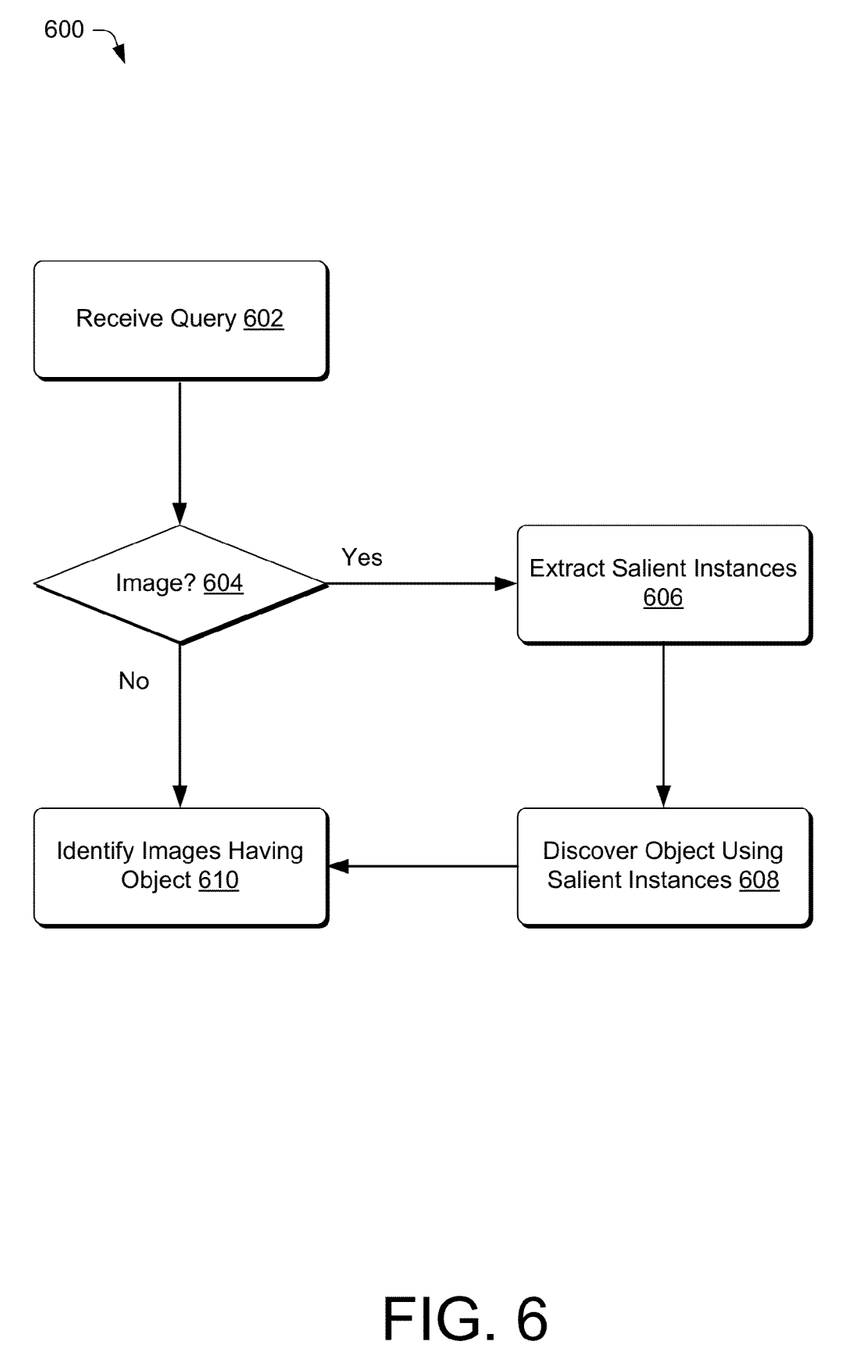

FIG. 6 is a flow diagram of an illustrative process 600 for image searches using saliency-guided MCL. At 602, the computer vision platform 104 receives a query for images. In some embodiments, the query may include an image, which may be analyzed by the computer vision platform 104. In these instances, the content of the image may include colors, shapes, textures, and/or other information that may be derived from raw data of the image.

In some embodiments, the query may include a keyword associated with an image (e.g., a description of the image) or with a concept. For example, the query may include keywords like "find 2010 in fashion." This type of query is difficult for the conventional image search techniques to perform due to lack of low-level descriptions (e.g., textures, colors, and shapes) and/or high-level descriptions (e.g., shoes, coats, and cars). But embodiments of the present disclosure perform unsupervised object class discovery via bMCL, which is suitable for searches using middle-level features (e.g., fashion, beauty, hot/cool).

At 604, the computer vision platform 104 may determine whether the query is associated with an image. For example, users may submit a sample image, instead of a string of text, that image searches may be performed based upon. If the query includes an image (i.e., the branch of "Yes" of 604), the computer vision platform 104 may, at 606, extract saliency instances from the image using techniques similar to those discussed in the process 400 as shown in FIG. 4. At 608, the computer vision platform 104 may discover one or more objects in the image based on the extracted saliency instances using the trained detector 206, which is similar to those discussed in the process 300 as shown in FIG. 3. Based on the discovered objects, candidate images may be identified corresponding to the image at 610. Similarly, if the query does not include an image (i.e., the branch of "No" of 604), the candidate images may be identified based on matches between the query (e.g., middle-level descriptions) and one or more object classes of the candidate images at 610.

Illustrative Algorithms

Figure 7:
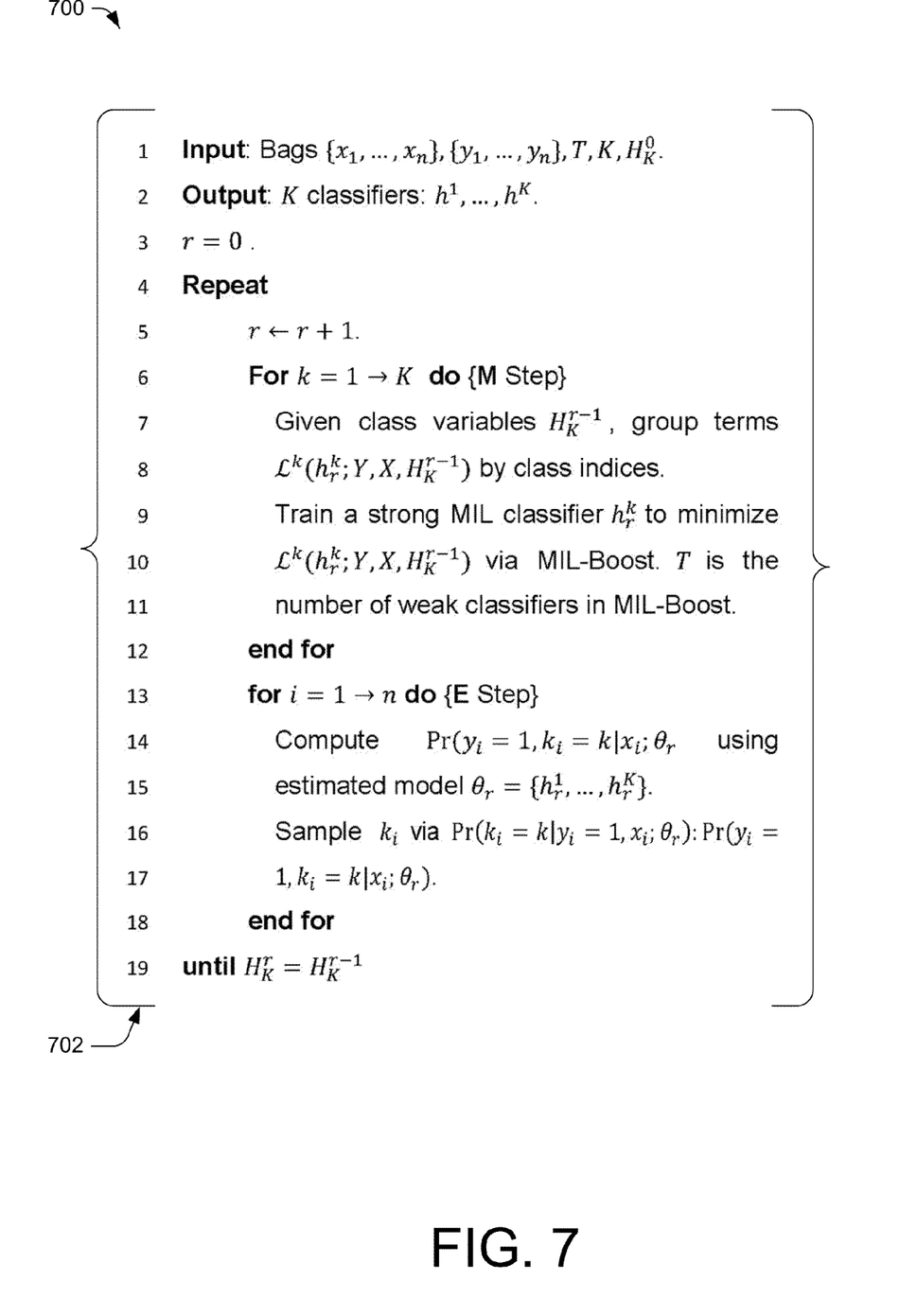
FIG. 7 illustrates an example algorithm for implementing saliency-guided multiple class learning.

FIG. 7 illustrates an example algorithm 700 for implementing saliency-guided multiple class learning. Specifically, the algorithm 700 may be implemented to compute some metric for influence of certain users. The algorithm 700 is used to present various illustrative implementations of features that are discussed above. The following discussion refers to the illustrative algorithm 700 by line numbers 702 shown in the left hand side of the algorithm. The discussion provides various features that may be implemented any order, function, or variation of modules to perform the various functions described more generally above. Therefore, the techniques discussed above are not limited by the implementation of the illustrative algorithm 700.

The algorithm 700 may include lines 1, which may collect positive bags and negative bags of the training images 102 using a saliency detection algorithm. The positive bags may include top saliency instances of the training images 102, while the negative bags may include bottom saliency instances and randomly sampled saliency instances of the training images 102. In some embodiments, an image of the training images 102 may be analyzed to obtain a positive bag and a negative bag. In some instances, the image may be assumed to have a foreground object class. In lines 1-2, positive and negative bags of the training images 102 may be analyzed as input of the algorithm 700, and a number of clusters (i.e., K classifiers) may be determined as learned results of the algorithm 700.

In lines 3-19, a DiscEM algorithm may be implemented to obtain the solution, K object detectors. Starting from step 0, lines 3-8 illustrate that clustering may be initialized using all the top saliency windows to obtain K initial clusters using a data mining algorithm (e.g., K-means algorithm). Lines 9-11 illustrate that individual cluster of the number of clusters may be trained based on weights of samples. The weight of individual sample may then be updated based on the clusters that have been trained as illustrated in lines 12-15. Lines 18-19 illustrate that the training may stop when no more improvement can be made.

Illustrative Multiple Instance Learning

In Multiple Instance Learning (MIL), each bag $x_i \in X^m$ may include a set of instances $\{x_{i1}, \ldots, x_{im}\}(x_{ij} \in X)$. While each bag $x_i$ has a class label $y_i \in y = \{-1, 1\}$ as training input, instance labels $y_{ij} \in y$ may be unknown and treated as hidden variables. In some embodiments, a bag may be labeled as positive if at least one instance is positive, while a bag may be labeled as negative if all instances are negative, $y_i = \max_j(y_{ij})$. In these instances, each bag may be assumed to have the same number of instances, $n_i = m$ ($i = 1, \ldots, n$).

Standard boosting MIL assumes an additive model on instance-level decisions: $h_{ij} = h(x_{ij})$, where $h(x_{ij}) = \Sigma_t \lambda_t h_t(x_{ij})$ is a weighted vote of weak classifiers $h_t: x \rightarrow y$. It may be assumed that $y_{ij} \in y$ is the hidden instance label having a probability of being positive, as shown in Equation 1:

$$p_{ij} = Pr(y_{ij} = 1 \mid x_{ij}; h) = \frac{1}{1 + \exp(-h_{ij})}. \quad (1)$$

The bag-level probability may be computed via a Noisy-OR (NOR) model using Equation 2:

$$p_i = Pr(y_i = 1 \mid x_i; h) = 1 - \Pi_{j=1}^{m}(1 - p_{ij}). \quad (2)$$

Since the bag label is given in the training set, the negative log-likelihood function may be optimize using $L_{MIL} = -\Sigma_{i=1}^{n}(1(y_i=1)\log p_i + 1(y_i=-1)\log(1-p_i))$, wherein $1(\cdot)$ is an indicator function; the algorithm greedily searches for $h^t$ over a weak classifier candidate pool, followed by a line search for $\lambda_t$. In Boost MIL framework, the weigh $w_{ij}$ on each instance $x_{ij}$ is updated as Equation 3:

$$w_{ij} = -\frac{\partial \mathcal{L}_{MIL}}{\partial h_{ij}} = \begin{cases} -\frac{1}{1-p_{ij}} \frac{\partial p_{ij}}{\partial h_{ij}} & \text{if } y_i = -1 \\ \frac{1-p_i}{p_i(1-p_{ij})} \frac{\partial p_{ij}}{\partial h_{ij}} & \text{if } y_i = 1 \end{cases} \quad (3)$$

Illustrative Bottom-up Multiple Class Learning

Given K object classes and N unlabeled images, n=2N bags (i.e., N positive bags and N negative bags based on bottom-up saliency detection) may be obtained. There are two kinds of hidden variables in the formulation: 1) the instance-level label $y_{ij}$ for each instance $x_{ij}$ in bag $x_i$ and 2) the class latent label $k_{ij} \in K = \{0, 1, \ldots, K\}$ for the instance $x_{ij}$ that belongs to the $k^{th}$ class ($k_{ij} = 0$ and $k_i = 0$ for the negative instance and bag respectively). In some embodiments, it is assumed that the existence of only one foreground object class in each positive bag. In other words, only one class of objects is allowed to appear in each image. Thus, the class label $k_i$ for each positive bag is defined based on the class labels of instances of the positive bag as shown in Equation 4:

$$k_i = \max_j k_{ij}, \text{ and, } \forall j, k_{ij} \in \{0, k\} \text{ with } k \in \{1, \ldots, K\}. \tag{4}$$

Here, $H=(H_K, H_1)$ is denoted as hidden variables where $H_K=\{k_i, i=1, \ldots, n\}$ and $H_1=\{l_{ij}, i=1, \ldots n, j=1, \ldots, m\}$ ($k_{ij}=y_{ij}\cdot k_i$).

For bags $X=\{x_1, \ldots, x_n\}$ with their corresponding labels $Y=\{y_1, \ldots, y_n\}$, the overall negative log-likelihood function $L(\theta; Y, X)$ may be defined as shown in Equation 5:

$$\mathcal{L}(\theta; Y, X) = -\log Pr(Y \mid X; \theta) \tag{5}$$
$$= -\log \sum_{H_K} Pr(Y, H_K \mid X; \theta)$$
$$= -\log \sum_{H_K} \sum_{H_I} Pr(Y, H \mid X; \theta),$$

where the model parameter $\theta=\{h^1, \ldots, h^k, \ldots, h^K\}$ and $h^k$ is the appearance model for the $k^{th}$ object class. The evaluation score for $x_{ij}$ to the $k^{th}$ class may be computed as $$q_{ij}^k = q^k(x_{ij}) = \frac{1}{1+\exp(-h_{ij}^k)}$$

where $h_{ij}^k = h^k(x_{ij})$. Thus, the instance-level probability may be computed using Equation 6:

$$^kp_{ij}^k = Pr(k_{ij}=k\mid x_{ij};\theta) \propto \Pi_{t=1}^K (q_{ij}^t)^{1(t=k)}(1-q_{ij}^t)^{1(t \neq k)}. \tag{6}$$

Accordingly, the probability $Pr(Y, H_K \mid X; \theta)$ may be derived, and all the bags are assumed to be conditionally independent as shown in Equation 7:

$$Pr(Y, H_K \mid X; \theta) = \Pi_{i=1}^n Pr(y_i, k_i \mid x_i; \theta) = \Pi_{i=1}^n [Pr(k_i \mid x_i; \theta) \cdot s_i], \tag{7}$$

where $s_i = 1((y_i=-1 \wedge k_i=0) \vee (y_i=1 \wedge k_i \neq 0))$.

The probability for each positive or negative bag, with $Pr(k_i=k\mid x_i; \theta) \approx q_i^k$ and $k \in \{0, 1, \ldots, K\}$ as (the full derivation is combinatorial), may be approximated using Equation 8:

$$q_i^k = \Pi_{t=1}^K \{[1-\Pi_{j=1}^m(1-p_{ij}^t)]^{1(t=k)} \cdot [\Pi_{j=1}^m (1-p_{ij}^t)]^{1(t \neq k)}\}, \tag{8}$$

where $1-\Pi_{j=1}^m(1-p_{ij}^t) = Pr(\exists j, k_{ij}=t\mid x_i; \theta)$ denotes the measure for at least one instance $x_{ij}$ in bag $x_i$ belonging to the $t^{th}$ class. $Pr(Y, H_K \mid X; \theta)$ may be then denoted in a class-wise manner as shown in Equation 9:

$$Pr(Y, H_K\mid X;\theta) \propto \Pi_{t=1}^K \Pi_{i=1}^n [(q_i^t)^{1(t=k_i)}(1-q_i^t)^{1(t \neq k_i)} \cdot s_i]. \tag{9}$$

The computer vision platform 104 may further explicitly use the instance-level hidden variables $H_1$ and denote $Pr(Y, H\mid X; \theta)$. Similar to the overall loss function $L(\theta; Y, X)$, the bag-level loss function $L(\theta; Y, X, H_K) = -\log Pr(Y, H_K\mid X; \theta)$ and instance-level loss function $L(\theta; Y, X, H) = -\log Pr(Y, H\mid X; \theta)$ may be defined. These functions may use the Discriminative EM (DiscEM) algorithm, which is discussed in greater detail below.

In the DiscEM algorithm, if the expectation of $H=\{H_K, H_1\}$ is estimated, the minimization of the overall loss function $$\frac{d}{d\theta}\mathcal{L}(\theta; Y, X)$$

may be decomposed into $$\frac{d}{d\theta}\mathcal{L}(\theta; Y, X, H),$$

and K standard boosting additive models on instance-level decisions: $h_{ij}^k = h^k(x_{ij})$ may be optimized, where $h^k(x_{ij}) = \Sigma_t \lambda_t h_t^k(x_{ij})$ is a weighted vote of weak classifiers $h_t^k: x \to y$. In this way, if the computer vision platform 104 estimates the hidden variables H, bMCL may be solved with standard Boost MIL framework.

Illustrative Discriminative EM

The optimization of Equation 5 deals with the hidden variable H. A general formulation of Discriminative EM (DiscEM) algorithm may be provided to perform discriminative learning in the presence of hidden variables. The computer vision platform 104 may directly apply the DiscEM to explore the hidden variable H in bMCL. It is observed that under the MIL assumption, Boost MIL may be equivalent to the formulation of bMCL. Based on this observation, the EM step for the instance-level hidden variables $H_1$ may be dealt with in a standard Boost MIL and only the class labels are tagged $H_K$ explicitly. Since the DiscEM algorithm is a general discriminative learning framework in the presence of hidden variables, the DiscEM algorithm can be applied to other situations with hidden space of explicit forms.

In some embodiments, labels $Y=\{y_1, \ldots, y_n\}$ may be provided in addition to observations $X=\{x_1, \ldots, x_n\}$, and the computer vision platform 104 may estimate the model $\theta$ that minimizes the negative log-likelihood function $L(\theta; Y, X)$. In some instances, H may be integrated out based on two theorems: Theorem 1 and Theorem 2, which are discussed in greater detail below.

Theorem 1 The discriminative expectation maximization (DiscEM) algorithm may be implemented to optimize the training set log likelihood $L(\theta; Y, X)$ model parameters $\theta$ in the presence of hidden variable H, via Equation 10:

$$\frac{d}{d\theta}\mathcal{L}(\theta; Y, X) = E_{H: Pr(H\mid Y, X;\theta)}\frac{d}{d\theta}\mathcal{L}(\theta; Y, X, H), \tag{10}$$

where $L(\theta; Y, X, H) = -\log Pr(Y, H\mid X; \theta)$. Notice that $$Pr(H\mid Y, X;\theta) = \frac{Pr(Y, H\mid X;\theta)}{Pr(Y\mid X;\theta)}$$

and X, Y are given.

The general form of the DiscEM algorithm may be similar to the standard EM. It is observed that an initial estimate $\theta_0$ with successively better estimates $\theta_1, \theta_2, \ldots$, may be performed until convergence. Each phase r consists of two steps: an E step which computes $Pr(H\mid Y, X; \theta)$ via previous estimate $\theta_r$ and an M step which updates $\theta_{r+1}$ by minimizing $L(\theta; Y, X)$. In some instances, parameter $\theta$ is a parameter of a classifer and parameter $\theta$ may be purely discriminative to take advantages of discriminative learning algorithms. This differentiates the DiscEM from other conditional-EM frameworks in which the task is to learn generative parameters through a discriminative objective. Compared with standard supervised algorithms, the DiscEM algorithm can better handle hidden variables and embrace a weakly supervised learning setting.

If all the data are assumed to be conditionally independent $Pr(Y|X; \theta) = \Pi_{i=1}^n Pr(y_i|x_i; \theta)$, Theorem 2 can connect Boost MIL and DiscEM.

Theorem 2 When the instance-level model (i.e., Equation 1) and the bag-level model (i.e., Equation 2) are used, Boost MIL's update rule (i.e., Equation 3) may be equivalent to DiscEM, which reads as Equation 11:

$$\frac{d}{d\theta}\log Pr(y_i|x_i;\theta) = \begin{cases} \sum_{j=1}^{m} \frac{-1}{1-p_{ij}} \frac{d}{d\theta} p_{ij} & \text{if } y_i = -1 \\ \sum_{j=1}^{m} \frac{1-p_i}{p_i(1-p_{ij})} \frac{d}{d\theta} p_{ij} & \text{if } y_i = 1 \end{cases} \quad (11)$$

DiscEM may be directly applied to bMCL since bMCL forms an optimization problem for discriminative cost function $L(\theta; Y, X)$ under the complex hidden variables $H=(H_K, H_1)$ in Equation 5. Based on Theorem 1, the computer vision platform 104 may alternate between E step (applying model $\theta_r$ to obtain the probability estimation of instance labels $H_1^r$ and class labels $H_K^r$, and sampling) and M step (train new classifiers based on sampled data). Furthermore, taking advantage of the equivalence between DiscEM and Boost MIL, the integration of instance labels $H_1$ may be replaced by a standard Boost MIL and $H_K$ may be integrated out.

Accordingly, Theorem 1 may be used to rewrite $$\frac{d}{d\theta}\mathcal{L}(\theta; Y, X)$$

as Equation 12:

$$\frac{d}{d\theta}\mathcal{L}(\theta; Y, X) = E_{H_K: Pr(H_K|Y,X;\theta)}\left[\frac{d}{d\theta}\mathcal{L}(\theta; Y, X, H_K)\right]. \quad (12)$$

The loss function may be decomposed in a class-wise manner as $L(\theta; Y, X, H_K) = \Sigma_{k=1}^{K} L^k(h^k; Y, X, H_K)$. Using Equation 9, $L^k(h^k; Y, X, H_K)$ may be computed as Equation 13:

$$L^k(h^k;Y,X,H_K) = -\Sigma_{i=1}^{n}[1(k=k_i)\log q_i^k + 1(k \neq k_i)\log(1-q_i^k)], \quad (13)$$

which is valid when all the $(y_i, k_i)$ in $(Y, H_K)$ satisfy the condition $s_i = (y_i = -1 \wedge k_i = 0) \vee (y_i = 1 \wedge k_i \neq 0)$, as shown in Equation 9. In these instances, there may be a normalization term in Equation 9, which may be ignored without affecting the general formulation of DiscEM in Equation 12.

Equation 13 may build K classifiers with each classifier $h^k$ taking bags labeled class k as positive bags and all the rest as negative bags, and minimizes $L^k(h^k; Y, X, H_K)$ respectively. This formulation may maximize margins among positive bags of different classes and also the negative bags since both support vector machines (SVM) and Boosting maximize the margin explicitly and implicitly respectively.

For each $L^k(h^k; Y, X, H_K)$, hidden instance variables $H_1$ may be further integrated out:

$$\frac{d}{d\theta}\mathcal{L}^k(h^k; Y, X, H_K) = E_{H_I: Pr(H_I|Y,H_K,X;\theta)}\left[\frac{d}{d\theta}\mathcal{L}^k(h^k; Y, X, H)\right]. \quad (14)$$

However, since $L^k(h^k; Y, X, H_K)$ may be the same cost function discussed in Theorem 2 (not integrating $H_1$ out in Equation 14), a standard boosting based MIL approach may be used to minimize the cost function.

Illustrative Computing Device

Figure 8:
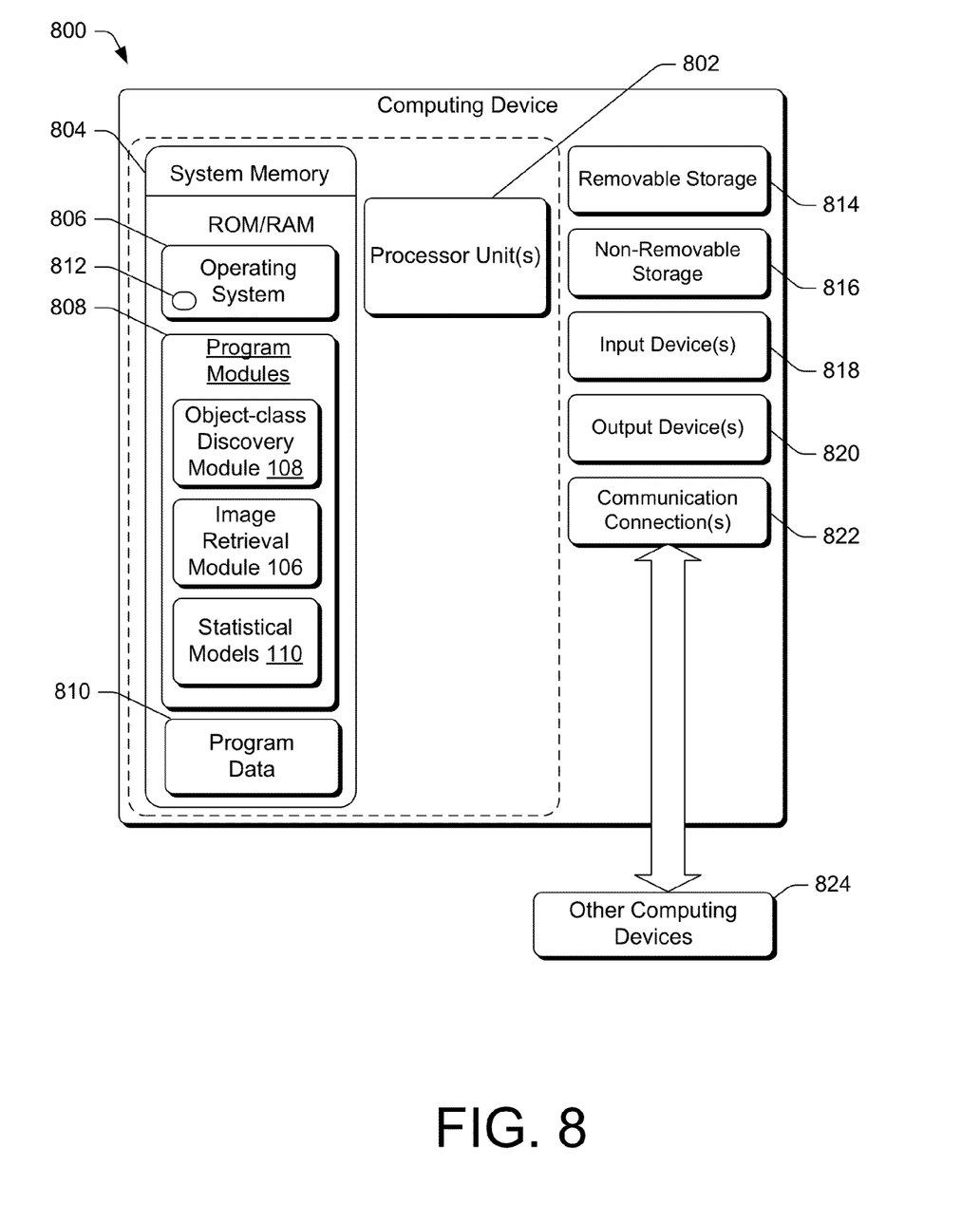
FIG. 8 illustrates an example computing device that may be deployed in the architecture shown in FIG. 1 and the scheme shown in FIG. 2.

FIG. 8 shows an illustrative computing device 800 that may be used to implement the speech recognition system, as described herein. The various embodiments described above may be implemented in other computing devices, systems, and environments. The computing device 800 shown in FIG. 8 is only one example of a computing device and is not intended to suggest any limitation as to the scope of use or functionality of the computer and network architectures. The computing device 800 is not intended to be interpreted as having any dependency or requirement relating to any one or combination of components illustrated in the example computing device.

Alternatively, or in addition, the functionally described herein may be performed, at least in part, by one or more hardware logic components. For example, and without limitation, illustrative types of hardware logic components that may be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

In a very basic configuration, the computing device 800 typically includes at least one processing unit 802 and system memory 804. Depending on the exact configuration and type of computing device, the system memory 804 may be volatile (such as RAM), non-volatile (such as ROM, flash memory, etc.) or some combination of the two. The system memory 804 typically includes an operating system 806, one or more program modules 808, and may include program data 810. For example, the program modules 808 may includes the object-class discovery module 108, the image retrieval module 106 and the statistical models 110, as discussed in the architecture 100, the scheme 200 and/or the illustrative processes 300-600.

The operating system 806 includes a component-based framework 812 that supports components (including properties and events), objects, inheritance, polymorphism, reflection, and the operating system 806 may provide an object-oriented component-based application programming interface (API). Again, a terminal may have fewer components but will interact with a computing device that may have such a basic configuration.

The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by removable storage 814 and non-removable storage 816. Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, or other data. The system memory 804, the removable storage 814 and the non-removable storage 816 are all examples of computer storage media. Computer storage media includes RAM, ROM, EEPROM, flash memory or other memory technology, CD-ROM, digital versatile disks (DVD), or other optical storage, magnetic cassettes, magnetic tape, magnetic disk storage or other magnetic storage devices, or any other non-transmission medium that can be used to store the desired information and which can be accessed by the computing device 800. Any such computer storage media may be part of the computing device 800. Moreover, the computer-readable media may include computer-executable instructions that, when executed by the processor unit(s) 802, cause the computing device 800 to perform various functions and/or operations described herein.

In contrast, communication media may embody computer-readable instructions, data structures, program modules, or other data in a modulated data signal, such as a carrier wave, or other transmission mechanism. As defined herein, computer storage media does not include communication media.

The computing device 800 may also have input device(s) 818 such as keyboard, mouse, pen, voice input device, touch input device, etc. In some embodiments, input methods may be implemented via Natural User Interface (NUI). NUI may include any interface technology that enables a user to interact with a device in a "natural" manner, free from artificial constraints imposed by input devices such as mice, keyboards, remote controls, and the like. Examples of NUI methods may include those relying on speech recognition, touch and stylus recognition, gesture recognition both on screen and adjacent to the screen, air gestures, head and eye tracking, voice and speech, vision, touch, gestures, and machine intelligence. Categories of NUI technologies may include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Output device(s) 820 such as a display, speakers, printer, etc. may also be included. These devices are well known in the art and are not discussed at length here.

The computing device 800 may also contain communication connections 822 that allow the device to communicate with other computing devices 824, such as over a network. These networks may include wired networks as well as wireless networks. The communication connections 822 are one example of communication media.

It is appreciated that the illustrated computing device 800 is only one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like. For example, some or all of the components of the computing device 800 may be implemented in a cloud computing environment, such that resources and/or services are made available via a computer network for selective use by mobile devices.

Conclusion

Although the subject matter has been described in language specific to structural features and/or methodological acts, it is to be understood that the subject matter defined in the appended claims is not necessarily limited to the specific features or acts described above. Rather, the specific features and acts are disclosed as example forms of implementing the claims.

What is claimed is:

1. A computer-implemented method for object class discovery, the method comprising:
   receiving multiple images having one or more unknown object classes;
   extracting multiple saliency instances from the multiple images, wherein the extracting multiple saliency instances from the multiple images comprises extracting multiple saliency windows as the multiple saliency instances using a window-based saliency detection algorithm;
   computing a score for each of the multiple saliency windows;
   clustering the multiple saliency windows to generate or update models wherein the clustering comprises:
      grouping multiple saliency windows having scores equal to or greater than a predetermined amount into a positive bag;
      grouping multiple saliency windows having scores less than the predetermined amount into a negative bag; and
   discovering the one or more object classes using the models.

2. The computer-implemented method of claim 1, wherein the clustering and the discovering are performed automatically and simultaneously.

3. The computer-implemented method of claim 1, wherein the clustering the multiple saliency windows comprises using a maximum margin multiple class learning algorithm.

4. The computer-implemented method of claim 1, wherein a predetermined number of saliency windows extracted from individual images of the multiple images are labeled as being associated with the positive bag.

5. The computer-implemented method of claim 4, wherein the clustering the multiple saliency windows comprises clustering the multiple saliency instances by maximizing margins among positive bags of the multiple images.

6. The computer-implemented method of claim 4, wherein background saliency instances of the individual images are labeled as being associated with the negative bag, and the clustering the multiple saliency windows comprises clustering the multiple saliency windows by maximizing margins:
   among positive bags of the multiple images, and
   between positive bags of the multiple images and negative bags of the multiple images.

7. One or more computer storage media storing computer-executable instructions that, when executed on one or more processors, causes the one or more processors to perform acts comprising:
   receiving a plurality of images;
   identifying multiple saliency instances from the plurality of images;
   extracting a predetermined number of saliency instances of an individual image of the plurality of images, the predetermined number of the saliency instances having higher saliency scores than other saliency instances extracted from the individual image;

clustering the multiple saliency instances by optimizing margins among the predetermined number of saliency instances; and training at least one statistical model using the clustered multiple saliency instances.

8. The one or more computer storage media of claim 7, wherein the optimizing the margins comprising maximizing the margins.

9. The one or more computer storage media of claim 7, wherein the acts further comprise:

grouping the predetermined number of saliency instances of individual image into a positive bag; and determining multiple positive bags for the plurality of images.

10. The one or more computer storage media of claim 9, wherein the optimizing margins among the predetermined number of saliency instances comprises maximizing margins among the multiple positive bags.

11. The one or more computer storage media of claim 7, wherein the acts further comprise:

grouping the predetermined number of saliency instances of individual images into a positive bag;

grouping saliency instances associated with backgrounds of the individual images into a negative bag; and determining multiple negative bags and multiple positive bags for the plurality of images.

12. The one or more computer storage media of claim 11, wherein the optimizing margins among the predetermined number of saliency instances comprises maximizing margins among the positive bags and margins between the multiple positive bags and the multiple negative bags.

13. The one or more computer storage media of claim 7, wherein the acts further comprise discovering object classes of the plurality of images using the at least one trained statistical model.

14. The one or more computer storage media of claim 7, wherein the acts further comprise:

receiving an image containing object that belongs to an object class;

discovering the object class using the at least one trained statistical model; and retrieving multiple images corresponding to the discovered object classes.

15. A machine learning system for object class discovery, the system comprising:

one or more processors; and memory to maintain a plurality of components executable by the one or more processors, the plurality of components comprising:

an extractor that:

extracts saliency instances of multiple images, and determines a first salient group and a second salient group of saliency instances of the multiple images based on saliency scores of the individual ones of the saliency instances, wherein the individual ones of the saliency instances in the first salient group have a score equal to or greater than a predetermined amount and the individual ones of the saliency instances in the second salient group have a score less than the predetermined amount, a clustering unit that clusters the multiple saliency instances to generate or update machine learning models by optimizing margins:

among two or more of the saliency instances of the first salient group of the multiple saliency instances, and between the two or more of the saliency instances of the first salient groups and two or more of the saliency instances of the second salient group of the multiple images, and a detector that discovers an object class using the machine learning models.

16. The system of claim 15, wherein the second salient group includes randomly sampled saliency instances of the individual ones of the multiple images.

17. The system of claim 15, wherein the optimizing the margins comprises maximizing the margins.

18. The system of claim 15, wherein the clustering and the discovering are implemented automatically and simultaneously.

* * * * *